United States Patent
Xiang et al.

(10) Patent No.: US 12,511,758 B2
(45) Date of Patent: Dec. 30, 2025

(54) METHOD FOR DETECTING AND TRACKING A TARGET, ELECTRONIC DEVICE, AND STORAGE MEDIUM

(71) Applicant: BIGO TECHNOLOGY PTE. LTD., Singapore (SG)

(72) Inventors: Wei Xiang, Guangzhou (CN); Jundong Wang, Guangzhou (CN); Lvran Chen, Guangzhou (CN); Jiening Jiao, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 409 days.

(21) Appl. No.: 18/040,721

(22) PCT Filed: Aug. 6, 2021

(86) PCT No.: PCT/CN2021/111255
§ 371 (c)(1),
(2) Date: Feb. 6, 2023

(87) PCT Pub. No.: WO2022/028592
PCT Pub. Date: Feb. 10, 2022

(65) Prior Publication Data
US 2023/0326036 A1    Oct. 12, 2023

(30) Foreign Application Priority Data

Aug. 6, 2020   (CN) .......................... 202010784786.6

(51) Int. Cl.
*G06T 7/20*     (2017.01)
*G06V 10/46*    (2022.01)
(Continued)

(52) U.S. Cl.
CPC .............. *G06T 7/20* (2013.01); *G06V 10/462* (2022.01); *G06V 10/82* (2022.01); *G06V 20/46* (2022.01)

(58) Field of Classification Search
CPC ............. G06T 7/20; G06T 2207/20084; G06T 2207/10016; G06V 10/462; G06V 20/46;
(Continued)

(56) References Cited

U.S. PATENT DOCUMENTS

| 7,184,100 B1* | 2/2007 | Wilf ........................ G11B 27/28 |
| | | 348/700 |
| 2017/0091950 A1* | 3/2017 | Munteanu ............ G06V 10/764 |

(Continued)

FOREIGN PATENT DOCUMENTS

| CN | 107563313 A | 1/2018 |
| CN | 110008793 A * | 7/2019 |

(Continued)

OTHER PUBLICATIONS

International Search Report of the International Searching Authority for State Intellectual Property Office of the People's Republic of China in PCT application No. PCT/CN2021/111255 issued on Nov. 5, 2021, which is an international application to which this application claims priority.

(Continued)

*Primary Examiner* — Syed Haider
(74) *Attorney, Agent, or Firm* — Kolitch Romano Dascenzo Gates LLC (57) ABSTRACT

A method for detecting and tracking a target is provided. The method includes: acquiring a target tracking result of each video frame of a plurality of video frames received from a video stream by inputting the each video frame of the plurality of video frames into a tracking network; in response to a video frame of the plurality of video frames
(Continued)

being a key frame, acquiring a target detection result output by a detection network upon receiving a last delay frame in a specified number of delay frames by inputting the key frame into the detection network and controlling the detection network to operate during a period of receiving the specified number of delay frames; and generating a final target tracking result based on the target detection result and a target tracking result of the last delay frame.

20 Claims, 7 Drawing Sheets

(51) Int. Cl.
  *G06V 10/82* (2022.01)
  *G06V 20/40* (2022.01)
(58) Field of Classification Search
  CPC .. G06V 10/82; G06V 2201/07; G06N 3/0464; G06N 3/045; G06N 3/096
  See application file for complete search history.

(56) References Cited

U.S. PATENT DOCUMENTS

2019/0130583 A1    5/2019  Chen et al.
2020/0388030 A1*  12/2020  Steelberg ............... G06V 20/46

FOREIGN PATENT DOCUMENTS

| CN | 110298213 A | 10/2019 |
| CN | 110400332 A | 11/2019 |
| CN | 110610510 A | 12/2019 |
| CN | 110751674 A | 2/2020 |
| CN | 111915639 A | 11/2020 |
| WO | 2018058530 A1 | 4/2018 |

OTHER PUBLICATIONS

Extended European Search Report Communication Pursuant to Rule 62 EPC for European Application No. 21852495.7 dated Jun. 10, 2024, which is a foreign counterpart application to this application.

Dong, Zuolin, et al., "Face Detection in Security Monitoring Based on Artificial Intelligence Video Retrieval Technology", IEEE Access, vol. 8, pp. 63421-63433, IEEE, USA, DOI: 10.1109/ACCESS.2020.2982779, figure 4, Mar. 23, 2020.

Yang, Wenfei, et al., "Tracking Assisted Faster Video Object Detection", 2019 IEEE International Conference on Multimedia and Expo (ICME), IEEE, pp. 1750-1755, IEEE, Piscataway, NJ, USA, DOI: 10.1109/ ICME.2019.00301, Section 1, figure 2, Jul. 8, 2019.

* cited by examiner

METHOD FOR DETECTING AND TRACKING A TARGET, ELECTRONIC DEVICE, AND STORAGE MEDIUM

CROSS-REFERENCE TO RELATED APPLICATION

This application is a U.S. national stage of international application No. PCT/CN2021/111255, filed on Aug. 6, 2021, which claims priority to Chinese Patent Application No. 202010784786.6, filed on Aug. 6, 2020, and entitled "TARGET DETECTION AND TRACKING METHOD AND DEVICE, ELECTRONIC EQUIPMENT AND STORAGE MEDIUM," the disclosures of which are herein incorporated by reference in their entireties.

TECHNICAL FIELD

The present disclosure relates to the field of video processing technologies, and in particular, relates to a method for detecting and tracking a target, an electronic device, and a storage medium.

BACKGROUND

With the increase in capacity and performance of mobile terminal hardware, videos and images are widely produced, used, and propagated on mobile terminals, and the detection and tracking of a target in videos receive great attention as part of intelligent video content understanding.

SUMMARY

Embodiments of the present disclosure provide a method for detecting and tracking a target, an electronic device, and a storage medium.

The present disclosure provides a method for detecting and tracking a target, including:
  acquiring a target tracking result of each video frame of a plurality of video frames received from a video stream by inputting the each video frame of the plurality of video frames into a tracking network;
  in response to a video frame of the plurality of video frames being a key frame, acquiring a target detection result output by a detection network upon receiving a last delay frame in a specified number of delay frames by inputting the key frame into the detection network and controlling the detection network to operate during a period of receiving the specified number of delay frames, wherein the key frame is a video frame for target detection in the video stream, and the specified number of delay frames are successive video frames following the key frame; and
  generating a final target tracking result based on the target detection result and a target tracking result of the last delay frame.

The present disclosure provides an electronic device for detecting and tracking a target, including:
  at least one processor; and
  a memory configured to store at least one program;
  wherein the at least one processor, when loading and running the at least one program, is caused to perform the method for detecting and tracking the target as described above.

The present disclosure provides a non-transitory computer-readable storage medium storing one or more computer programs therein, wherein the one or more computer programs, when loaded and run by a processor, cause the processor to perform the method for detecting and tracking the target as described above.

DETAILED DESCRIPTION

A target detection and tracking framework includes a detection algorithm and a tracking algorithm. The detection algorithm is in charge of positioning and identifying target objects in a video, and the tracking algorithm is in charge of tracking and smoothing the target objects in the video. Target detection is usually performed on a key frame, and the detected target objects are tracked using the tracking algorithm at non-key frames (also referred to as tracking frames). However, when processing the key frame, the detection algorithm is time-consuming, which can cause a surge of a time-consuming peak value of the detection and tracking corresponding to the key frame. Because mobile terminal can receive a next video frame only after the operation of the detection algorithm performed on the current key frame is finished, the mobile terminal with limited computing resources is likely frozen upon receiving the key frame, thereby ultimately reducing an experience of a user.

To solve the problem that the mobile terminal is likely frozen using the method of detecting and tracking the target in the related art, embodiments of the present disclosure provide a method for detecting and tracking a target, an electronic device, and a storage medium.

The present disclosure is described hereinafter with reference to the accompanying drawings and embodiments.

Embodiment 1

Figure 1:
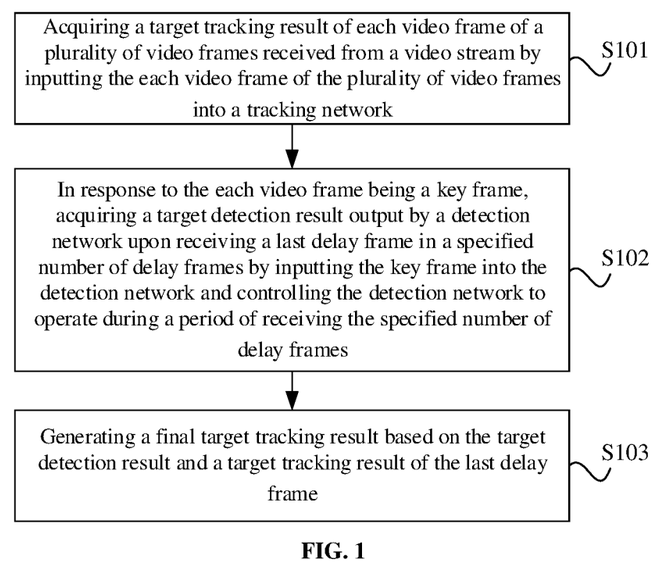
FIG. 1 is a process flowchart of a method for detecting and tracking a target according to Embodiment 1 of the present disclosure.

FIG. 1 is a process flowchart of a method for detecting and tracking a target according to Embodiment 1 of the present disclosure. The embodiment of the present disclosure is applicable to detecting and tracking a target in a video, and the method can be performed by an apparatus for detecting and tracking a target provided by the embodiments of the present disclosure. The apparatus for detecting and tracking the target may be achieved by hardware or software and integrated into an electronic device provided by the embodiments of the present disclosure. As shown in FIG. 1, the method for detecting and tracking the target includes the following processes.

In S101, a target tracking result of each video frame of a plurality of video frames received from a video stream is acquired by inputting the each video frame of the plurality of video frames into a tracking network.

In the embodiment of the present disclosure, the video stream includes a plurality of video frames, and the plurality of video frames are played at a certain frame rate to form a video play screen. For tracking a target in a video, each time a video frame is received from a decoded video stream, the video frame is input into a pre-trained tracking network to acquire a target tracking result of the video frame. The target may be a face, a vehicle, a person, an animal, and other objects in the video. The tracking network may be a network that tracks a detected target in the plurality of video frames. The target tracking result may include a tracked target list or a position, a state, a speed, or a trace of a target in the tracked target list. The tracking network in the embodiment of the present disclosure may be achieved by a variety of neural networks, and neither the tracking network nor the target in the video is limited in the embodiments of the present disclosure.

In S102, in response to a video frame of the plurality of video frames being a key frame, a target detection result output by a detection network is acquired upon receiving a last delay frame of a specified number of delay frames by inputting the key frame into the detection network and controlling the detection network to operate during a period of receiving the specified number of delay frames.

In the plurality of video frames of the video stream, the key frame is a video frame for target detection in the video stream. The specified number of delay frames are successive video frames following the key frame. The key frame may be a video frame preset by a user. For example, the user may set video frames with a certain frame interval as the key frames. Exemplarily, there is a key frame every 10 frames or 20 frames. Alternatively, an I frame in the video stream may be directly set as the key frame, or the user may set the key frame depending on the video content, which is not limited herein.

In a process of receiving the video frames from the video stream, in a case that the received video frame is detected to be the key frame according to a way that the user sets for determining the key frame, a specified number of successive video frames following the key frame are determined as the delay frames. The key frame is input into the detection network to detect a target in the key frame. During the operation of the detection network, the detection network is controlled to operate during the period of receiving the specified number of delay frames, such that the target detection result is output upon receiving the last delay frame.

A computing node is a node that controls the detection network to stop during the operation of the detection network. In the case that the key frame is input into the detection network, in response to sequentially receiving the specified number of delay frames, a plurality of computing nodes of the detection network is controlled to operate sequentially, and until receiving the last delay frame, the detection network operates a last computing node and outputs the target detection result. For example, for a cascaded detection network, an input node of each level of sub-networks of the cascaded detection network is used as a computing node. In response to sequentially receiving the specified number of delay frames, many levels of sub-networks are successively operated in an order of sub-networks of the cascaded detection network, such that the target detection result is output by a last-level sub-network upon receiving the last delay frame. For a non-cascaded detection network, the non-cascaded detection network may be divided into a plurality of partial networks based on an operation duration, and an output of each of the partial networks is used as a computing node. That is, upon operating for a certain duration, the non-cascaded detection network is suspended and an intermediate result is saved. Upon receiving one of the delay frames, the non-cascaded detection network is resumed to operate from the suspended position, and in the case that the last delay frame is received, the operation of a remaining part of the non-cascaded detection network is finished to acquire the target detection result. In practice, the operation of the detection network may be controlled in other ways during the period of receiving the delay frames, which is not limited herein.

In S103, a final target tracking result is generated based on the target detection result and a target tracking result of the last delay frame.

In the embodiment of the present disclosure, the detection network is in charge of identifying and positioning new targets, and the tracking network performs the target tracking based on an output of the detection network. Upon the detection network outputting the target detection result, in the case that a new target is detected, the new target is stored in a detected target list. Meanwhile, the tracking network predicts and updates, based on a current video frame and a history tracked target, a current position of the tracked target, then correlates a position-updated tracked target list with the detected target list, and updates state information of the tracked target list, wherein the state information includes that the target still exists, the target is lost, the target leaves, or the like. In the case that a detected target is a new target, the new target is added to the tracked target list, and information about the new target, such as a trace or a speed, is recorded. In the case that it is detected that a currently tracking target is lost or leaves, the target is destroyed and removed from the tracked target list, and the tracked target list is finally output.

In the embodiment of the present disclosure, the key frame is simultaneously input into the detection network and the tracking network. During the processing of the specified number of delay frames in the detection network, each of the delay frames is input into the tracking network and the target tracking result of each of the delay frames is acquired. In the case that the detection network outputs the target detection result upon processing the last delay frame, the final target tracking result of the delay frame can be generated based on the target detection result and the target tracking result of the last delay frame. For example, a newly appeared target, a lost target, or a leaving target may be determined by comparing the detected target list in the target detection result with the tracked target list in the target tracking result, such that the tracked target list can be updated, and the updated tracked target list can be output and a subsequent target tracking can be performed based on the updated tracked target list.

According to the embodiment of the present disclosure, each video frame received from the video stream is input into the tracking network to acquire the target tracking result of the video frame. In the case that a video frame is a key frame, the key frame is input into the detection network and the detection network is controlled to operate during the period of receiving the specified number of delay frames, and the target detection result output by the detection network is acquired upon the last delay frame being received. The final target tracking result is generated based on the target detection result and the target tracking result of the last delay frame. The embodiment of the present disclosure can avoid the problems of the surges of the time-consuming peak value and/or video lags caused by consuming longer time in target detection and receiving the next video frame only after the target detection on the key frame is finished. By controlling the detection network to operate during the period of receiving a plurality of delay frames, the time consumption of the target detection is apportioned into the period of receiving the plurality of delay frames. In this way, the time-consuming peak value of the target detection on the key frame is significantly reduced, such that the next video frame is capable of being played in time upon the key frame being played, and the video is capable of being played at a preset frame rate, thus ensuring that the video is played smoothly.

Embodiment 2

Figure 2:
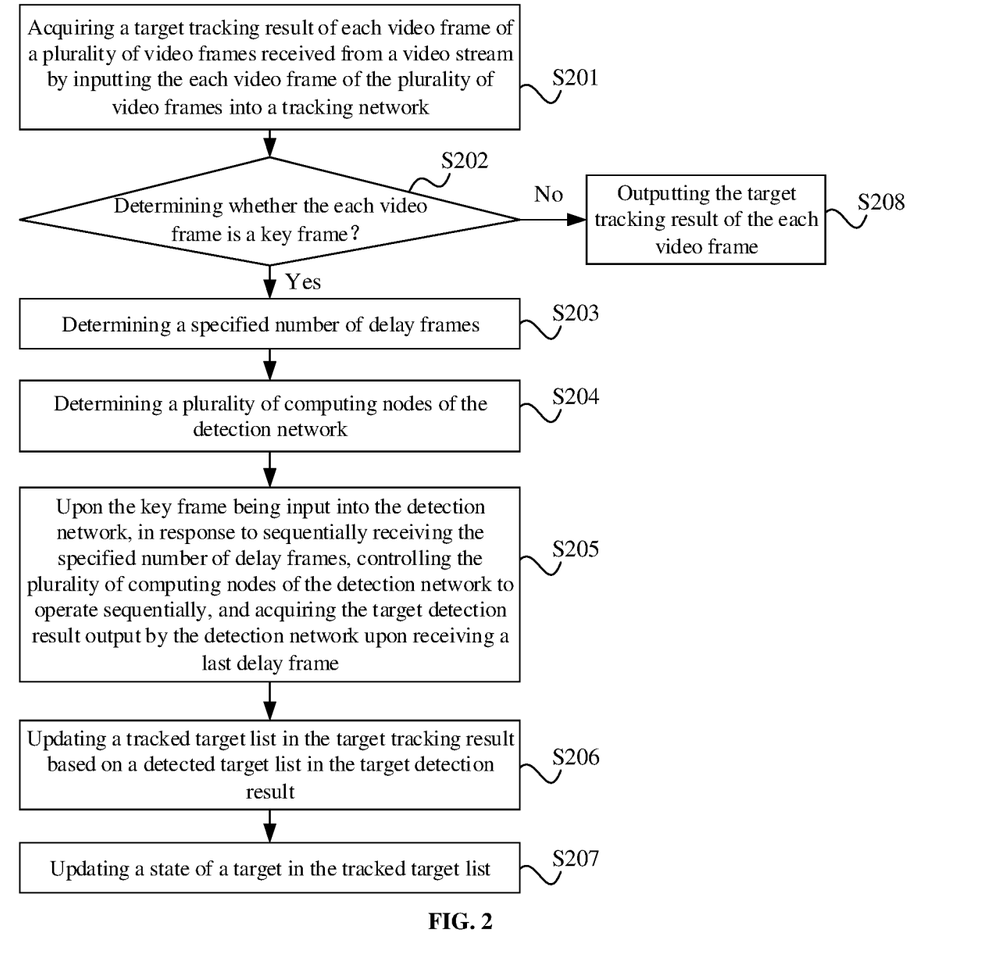
FIG. 2 is a process flowchart of a method for detecting and tracking a target according to Embodiment 2 of the present disclosure.

FIG. 2 is a process flowchart of a method for detecting and tracking a target according to Embodiment 2 of the present disclosure. This embodiment is described on the basis of Embodiment 1. As shown in FIG. 2, the method for detecting and tracking the target according to the embodiment of the present disclosure includes the following processes.

In S201, a target tracking result of each video frame of a plurality of video frames received from a video stream is acquired by inputting the each video frame of the plurality of video frames into a tracking network.

In S202, it is determined whether the video frame is a key frame.

In this embodiment of the present disclosure, the key frame may be a video frame, preset by a user, used for target detection. In an example of the present disclosure, the user may set video frames spaced apart by a certain number of frames as the key frames. The each video frame received from the video stream is input into the tracking network, and meanwhile, it is determined whether a currently received video frame is the key frame based on the certain number of frames. For example, video frames spaced apart by 15 frames are set as the key frames, and the number of the received video frames is counted. That is, each time a video frame is received, the number of video frames is plus one. In a case that the number of video frames is 15N+1 (N is a natural number), the video frame is determined as the key frame. Alternatively, the user divides the video stream into a plurality of segments, and in a case that the received video frame is a first video frame of any of the segments, the video frame is determined as the key frame. Alternatively, the user sets an I frame of the video stream as the key frame, such that in a case that the received video frame is detected to be the I frame, the received frame is determined as the key frame. In the embodiments of the present disclosure, the ways to set the key frame may be different, and the ways to determine whether a video frame is the key frame may also be different, which are not limited herein.

In the embodiment of the present disclosure, in the case that the received video frame is determined to be the key frame, S203 to S207 are performed; and in the case that the received video frame is determined to be a non-key frame, S208 is performed to directly output a tracking result of the video frame.

In S203, a specified number of delay frames are determined.

In the embodiment of the present disclosure, the delay frame is a video frame in the video stream following the key frame, and the number of delay frames is predetermined depending on actual situations. In an example of the present disclosure, in a case that a detection network is a cascaded detection network, a sum of numbers of key frame and delay frames is equal to the number of sub-networks in the cascaded detection network. That is, the number of delay frames is equal to the number of sub-networks in the cascaded detection network minus 1 (the number of key frame is 1). Upon the user determining the to-be-used cascaded detection network, the number of delay frames may be set based on the number of sub-networks in the cascaded detection network. For example, in the case that the cascaded detection network includes three sub-networks, two successive video frames following the key frame may be set as the delay frames. In another example of the present disclosure, in a case that the detection network is a non-cascaded detection network, a total duration required for the target detection on the key frame by the non-cascaded detection network may be estimated, and then the number of delay frames may be preset based on the total duration. For example, a frame rate of the video stream is 30 frames per second (FPS), and the total duration required for the target detection on the key frame by the non-cascaded detection network is controlled to be apportioned equally to the delay frames. In order to avoid the problem that the number of delay frames being excessive causes that a target detection result deviates excessively from an actual position of a target in the key frame, the number of delay frames may be set as 5 frames. That is, the target detection result of the non-cascaded detection network is delayed by about 0.17 seconds (5/30). In practice, the number of delay frames may be set depending on actual needs, which is not limited herein.

In S204, a plurality of computing nodes of the detection network are determined.

The computing node of the detection network is a node configured to control the suspension and resumption of the operation of the detection network during the operation of the detection network. The computing node may be any node in the detection network. In a case that the operation of the computing node is suspended, each time the detection network receives a delay frame, the operation of the detection network is resumed from the suspended computing node.

In an example of the present disclosure, the cascaded detection network includes a plurality of sub-networks, and then input nodes of the sub-networks in the cascaded detection network may be set as the computing nodes. For the non-cascaded detection network, a duration from an operation start time of the non-cascaded detection network to a time at which the non-cascaded detection network operates each of the computing nodes is determined based on the total duration and the number of delay frames, and an end time of the duration may be determined as an operation suspend time of the computing node.

In S205, upon the key frame being input into the detection network, in response to sequentially receiving the specified number of delay frames, the plurality of computing nodes of the detection network are controlled to operate sequentially, and the target detection result output by the detection network is acquired upon receiving a last delay frame.

In practice, in the case that the video frame is the key frame, the key frame is input into the detection network first and the detection network is controlled to operate during a period of receiving the plurality of delay frames. The plurality of computing nodes of the detection network can be triggered to operate sequentially by receiving the delay frames.

In an example of the present disclosure, the detection network is the cascaded detection network, and the computing nodes are inputs of the sub-networks. A candidate box is output upon inputting the key frame into a first-level sub-network of the cascaded detection network; in response to receiving a first delay frame, a candidate box is output by inputting the first delay frame and the candidate box output by the first-level sub-network into a second-level sub-network; in response to receiving a second delay frame, a candidate box is output by inputting the second delay frame and the candidate box output by the second-level sub-network into a third-level sub-network; and the like. Until receiving a last delay frame, a detection box output by a last-level sub-network, by inputting the last delay frame into the last-level sub-network, is determined as the target detection result.

In other examples of the present disclosure, the detection network is the non-cascaded detection network. The operation suspend time of each of the computing nodes of the non-cascaded detection network is calculated based on the total duration required for the target detection on the key frame by the non-cascaded detection network and the specified number. The operation duration of the non-cascaded detection network is timed in response to the key frame being input into the non-cascaded detection network. In response to the operation duration reaching the operation suspend time of the computing node, the operation of the non-cascaded detection network is suspended, and an operation result is saved. In response to receiving one of the delay frames, the operation of the non-cascaded detection network is resumed from the computing node based on the operation result, and the like. Until receiving the last delay frame, the operation of the non-cascaded detection network is finished, and the target detection result is output.

According to the embodiment of the present disclosure, by arranging the computing node of the detection network and controlling the computing nodes to operate sequentially in response to sequentially receiving the specified number of delay frames, the target detection result is output upon receiving the last delay frame, such that the detection network is controlled to operate during the period of receiving the plurality of delay frames. Time consumption of the target detection is apportioned into the period of receiving the plurality of delay frames, and a time-consuming peak value of the target detection on the key frame is significantly reduced. In this way, the next video frame is capable of being played in time upon playing the key frame, such that the video is capable of being played at a preset frame rate, and the video is ensured to be smoothly played.

In S206, a tracked target list in the target tracking result is updated based on a detected target list in the target detection result.

In the embodiment of the present disclosure, the target detection result includes the detected target list and information, such as positions, traces, speeds, or the like, of a plurality of targets in the detected target list; and the target tracking result includes the tracked target list and states of a plurality of tracked targets in the tracked target list, wherein the states include that target is indicated as lost, the target leaves, or the like.

In the case that the detection network outputs the target detection result, the target that is lost, leaves, or newly appears is determined by comparing the detected target list in the target detection result with a tracked target list in a target tracking result of the last delay frame, based on which the tracked target list can be updated.

In S207, a state of a target in the tracked target list is updated.

For a tracked target in the tracked target list, in the case that the target exists in the detected target list, a state of the target is marked as existing; and in the case that the target does not exist in the detected target list, the state of the target is marked as lost or disappeared.

In some optional embodiments of the present disclosure, in the case that a target state of the target in the tracked target list is indicated as lost, the key frame is determined. Then, the target detection result is acquired by inputting the key frame into the detection network, and the state of the target, of which the target state is indicated as lost, is confirmed based on the target detection result. In the case that the target state of the target in the tracked target list is indicated as lost, an $N^{th}$ video frame received following the last delay frame is determined as the key frame, wherein N is a natural number. That is, in the case that the state of the target is indicated as lost or disappeared, the $N^{th}$ video frame received following the delay frame is determined as the key frame and input into the detection network to acquire the target detection result, such that the state of the target, of which the target state is indicated as lost, can be confirmed based on the target detection result. In a case that the target is confirmed to be lost or disappeared, the target is destroyed from the tracked target list, such that problems such as missed detection or false detection caused by errors in detection are prevented, and thus the accuracy of the tracked target list is ensured.

In S208, the target tracking result of the video frame is output.

In this embodiment of the present disclosure, in the case that a video frame is a non-key frame, a target tracking result acquired by target tracking on the video frame is determined as an output.

According to the embodiment of the present disclosure, each video frame of the plurality of video frames received from the video stream is input into the tracking network to acquire the target tracking result of the video frames. Then, it is determined whether the video frame is the key frame, in the case that the video frame is the key frame, the specified number of delay frames are determined, and the plurality of computing nodes of the detection network are determined. Upon inputting the key frame into the detection network, the plurality of computing nodes of the detection network are controlled to operate sequentially in response to sequentially receiving the specified number of delay frames, such that the target detection result is output by the detection network upon the last delay frame being received. The tracked target list in the target tracking result is updated based on the detected target list in the target detection result, the state of the target in the tracked target list is updated, and then the tracked target list is output as the final detection and tracking result. Because the time consumption of the target detection is apportioned into the period of receiving the plurality of delay frames by controlling, through the computing nodes, the detection network to operate during the period of receiving the plurality of delay frames, the time-consuming peak value of the target detection on the key frame is significantly reduced. In this way, the next video frame is capable of being played in time upon the key frame being played, such that the video is capable of being played at a preset frame rate, and thus the video is ensured to be smoothly played.

Embodiment 3

Figure 3A:
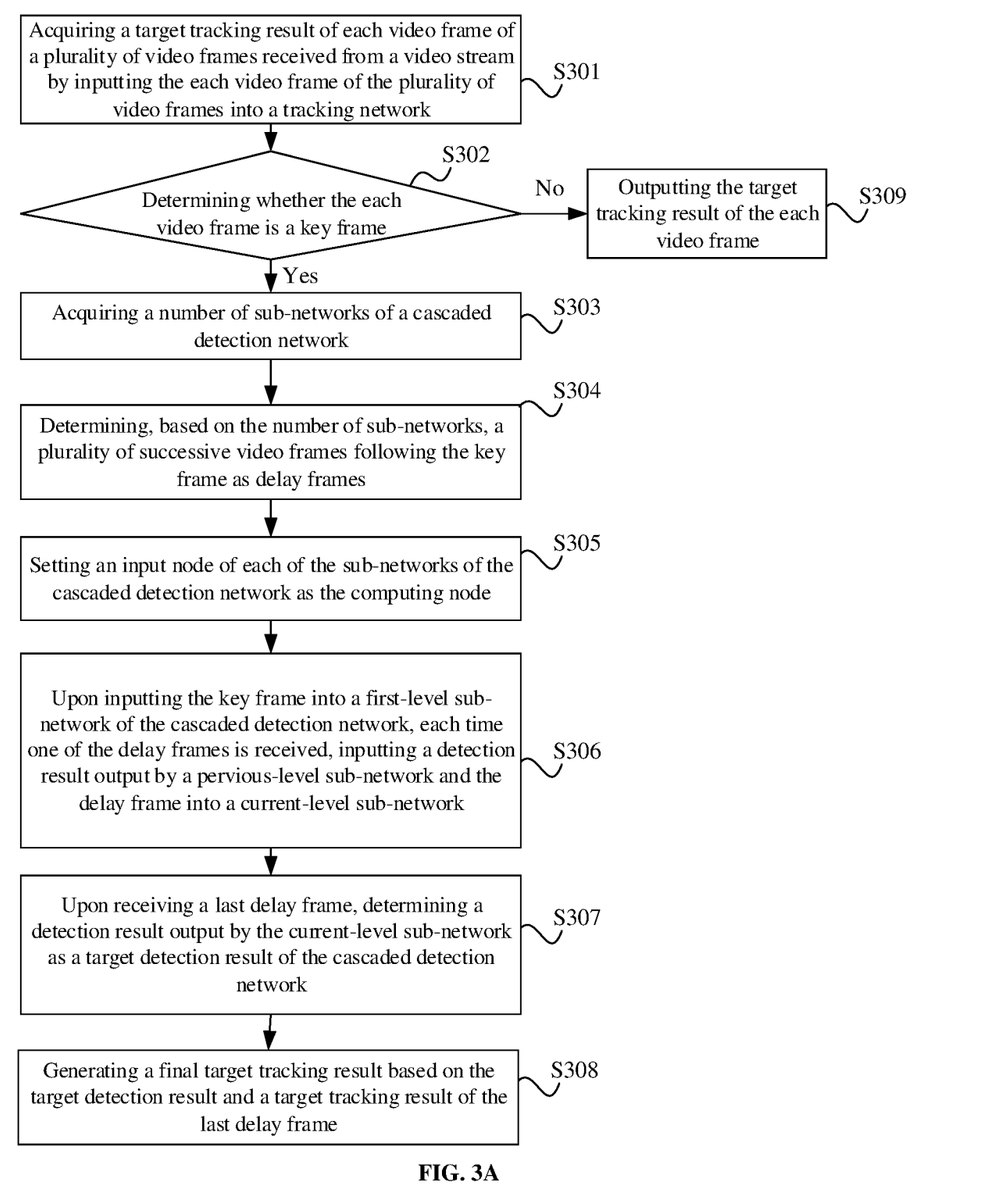
FIG. 3A is a process flowchart of a method for detecting and tracking a target according to Embodiment 3 of the present disclosure.

FIG. 3A is a process flowchart of a method for detecting and tracking a target according to Embodiment 3 of the present disclosure. This embodiment is described on the basis of the above Embodiment 1. As shown in FIG. 3A, the method for detecting and tracking the target according to the embodiment of the present disclosure includes the following processes.

In S301, a target tracking result of each video frame of a plurality of video frames received from a video stream is acquired by inputting the each video frame of the plurality of video frames into a tracking network.

In S302, it is determined whether the video frame is a key frame.

In S303, a first number of sub-networks of a cascaded detection network is acquired.

In the embodiment of the present disclosure, the detection network is the cascaded detection network, which is a pre-trained detection network. The cascaded detection network includes a plurality of sub-networks, and the number of sub-networks of the cascaded detection network may be acquired. In an example of the present disclosure, the cascaded detection network is a multi-task convolutional neural network (MTCNN). The MTCNN includes three sub-networks, which are respectively P-Net, R-Net, and O-Net. The P-Net is a fully connected network configured for extracting a target candidate box from the video frame through a sliding window (with a window size of 12). The R-Net (with an input video frame resolution of 24) and the O-Net (with an input video frame resolution of 48) are used as filters to respectively filter non-target candidate boxes of their pervious-level sub-networks, and then the remaining candidate boxes are target detection boxes. In practice, the cascaded detection network may be other cascaded networks such as a Faster region-based convolutional neural network (RCNN).

In S304, a plurality of successive video frames following the key frame are determined as delay frames based on the first number.

The video frame following the key frame may be used as the delay frame. Upon determining the number of sub-networks of the cascaded detection network, the plurality of successive video frames following the key frame may be used as the delay frames. Because the key frame is input into a first-level sub-network of the cascaded detection network, a difference between the numbers of sub-networks and the delay frames is 1. Exemplarily, the number of sub-networks of the cascaded detection network is 4, and the number of delay frames is 3, that is, a first video frame, a second video frame, and a third video frame following the key frame are determined as the delay frames.

In S305, an input node of each of the sub-networks of the cascaded detection network is set as the computing node.

In the cascaded detection network, each of the sub-networks is an independent network, and the input node of each of the sub-networks may be used as the computing node.

In S306, upon inputting the key frame into a first-level sub-network of the cascaded detection network, each time one of the delay frames is received, a detection result output by a pervious-level sub-network and the delay frame are input into a current-level sub-network.

In practice, a detection result is output upon the key frame being input into the first-level sub-network of the cascaded detection network, wherein the detection result is a candidate box of a target. For a second-level sub-network, in response to receiving a first delay frame following the key frame, a candidate box of the target is output by inputting the candidate box output by the first-level sub-network and the first delay frame into the second-level sub-network, and the like. Each time one of the delay frames is received, the detection result output by the previous-level sub-network and the received delay frame are input into the current-level sub-network.

In S307, upon receiving a last delay frame, a detection result output by the current-level sub-network is determined as a target detection result of the cascaded detection network.

In the embodiment of the present disclosure, in response to sequentially receiving the specified number of delay frames, the plurality of sub-networks of the cascaded detection network are triggered to calculate sequentially. In the case that the last delay frame is received, the current-level sub-network is a last-level sub-network of the cascaded detection network, a candidate box, output by a pervious-level sub-network prior to the last-level sub-network, and the last delay frame are input into the last-level sub-network, and a detection box output by the last-level sub-network is the target detection result.

In S308, a final target tracking result is generated based on the target detection result and a target tracking result of the last delay frame.

In S309, the target tracking result of the video frame is output.

Figure 3B:
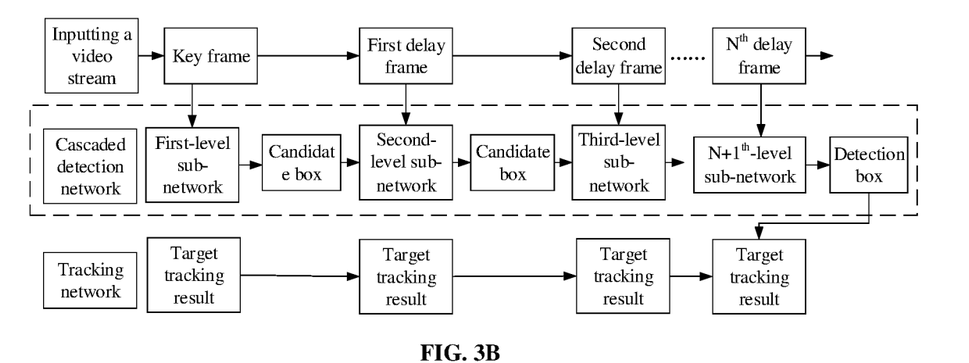
FIG. 3B is a schematic diagram of target detection based on a cascaded detection network according to Embodiment 3 of the present disclosure.

A process of the operation of the cascaded detection network during the period of receiving the delay frames is described hereinafter in conjunction with FIG. 3B. As shown in FIG. 3B, the process of the operation of the cascaded detection network is as follows.

Upon inputting the video stream, each video frame of the plurality of video frames is input into the tracking network, and the tracking network outputs the target tracking result of the each video frame. In the case that the video frame is the non-key frame, the target tracking result of the video frame is determined as the final target tracking result. In the case that the video frame is the key frame, the key frame is input into the first-level sub-network of the cascaded detection network and the candidate box of the target is output. Meanwhile, N video frames following the key frame are determined as the delay frames. In response to receiving a first delay frame, the candidate box of the first-level sub-network and the first delay frame are input into the second-level sub-network, such that the second-level sub-network outputs a candidate box; in response to receiving a second delay frame, the candidate box of the second-level sub-network and the second delay frame are input into a third-level sub-network, such that the third-level sub-network outputs a candidate box; and the like. In response to receiving an $N^{th}$ delay frame, a candidate box output by an $N^{th}$-level sub-network and the $N^{th}$ delay frame are input into an $(N+1)^{th}$-level sub-network, such that the $(N+1)^{th}$-level sub-network outputs a detection box which is determined as the target detection result. Then, the final target tracking result is generated by correlating the target detection result with a target tracking result of the $N^{th}$ delay frame.

According to the embodiment of the present disclosure, for the cascaded detection network, upon acquiring the target tracking results of the video frames received from the video stream by inputting each video frame of the video frames into the tracking network, in the case that the video frame is determined to be the key frame, the first number of the sub-networks of the cascaded detection network is acquired, the plurality of successive video frames following the key frame are determined as the delay frames based on the first number, and the input node of each of the sub-networks of the cascaded detection network is determined as the computing node. Then, the key frame is input into the first-level sub-network of the cascaded detection network, and each time one of the delay frames is received, the detection result output by the pervious-level sub-network and the delay frame are input into the current-level sub-network. Upon receiving the last delay frame, the detection result output by the current-level sub-network is used as the target detection result of the detection network. The final target tracking result is generated based on the target detection result and the target tracking result of the last delay frame. In this embodiment of the present disclosure, the number of delay frames is determined based on a cascaded number of the cascaded detection network, and the input of each of the cascaded sub-networks is arranged as the computing node. In response to sequentially receiving the specified number of delay frames, the plurality of cascaded sub-networks are controlled to operate sequentially, such that time consumption of the target detection is apportioned into the period of receiving the plurality of delay frames. In this way, a time-consuming peak value of the target detection on the key frame is significantly reduced, such that the next video frame is capable of being played in time upon playing the key frame, and thus the video is capable of being played at a preset frame rate, ensuring that the video is played smoothly.

Embodiment 4

Figure 4A:
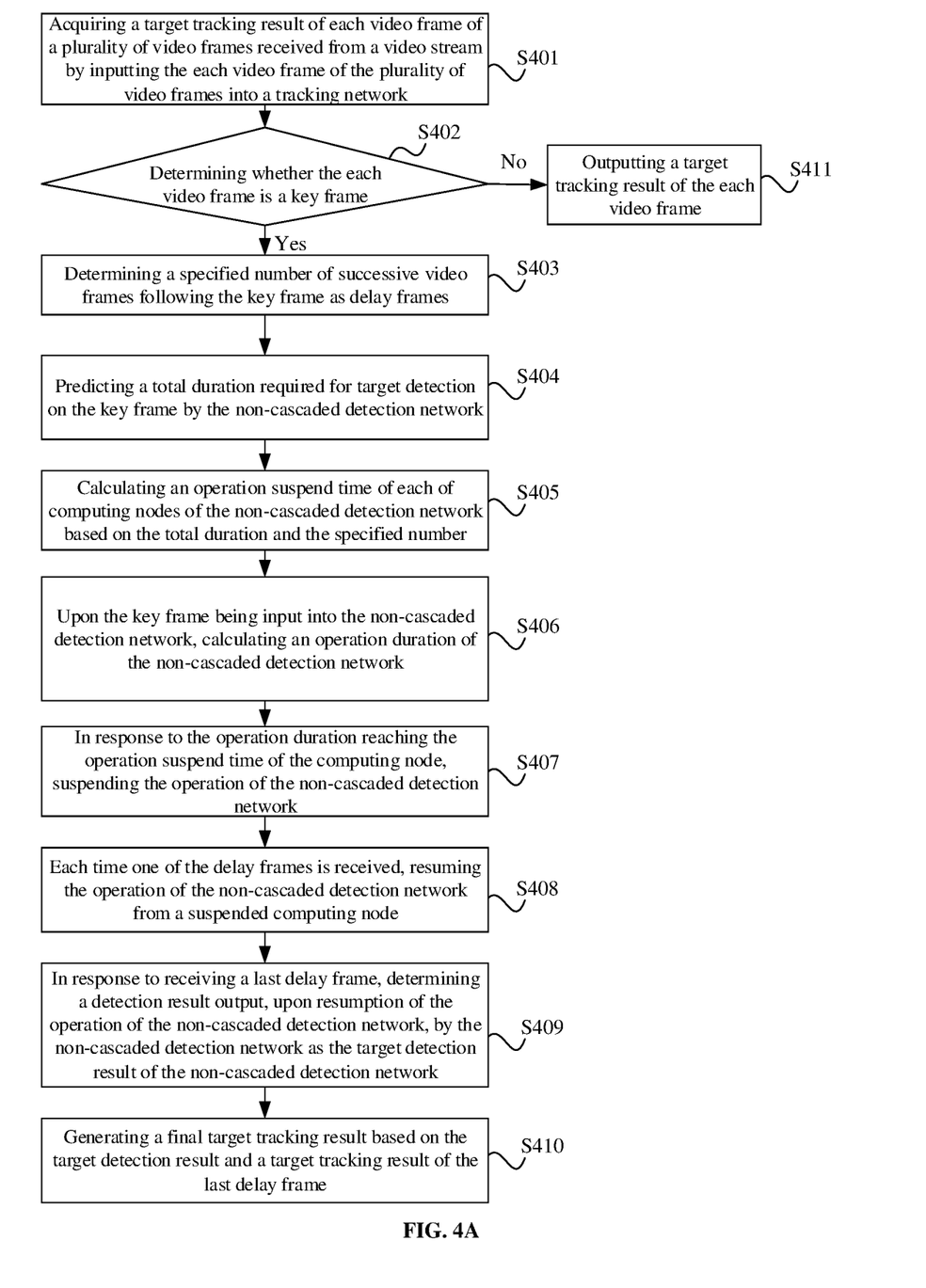
FIG. 4A is a process flowchart of a method for detecting and tracking a target according to Embodiment 4 of the present disclosure.

FIG. 4A is a process flowchart of a method for detecting and tracking a target according to Embodiment 4 of the present disclosure. This embodiment is described on the basis of the above Embodiment 1. As shown in FIG. 4A, the method for detecting and tracking the target according to the embodiment of the present disclosure includes the following processes.

In S401, a target tracking result of each video frame of a plurality of video frames received from a video stream is acquired by inputting the each video frame of the plurality of video frames into a tracking network.

In S402, it is determined whether the video frame is a key frame.

In S403, a specified number of successive video frames following the key frame are determined as delay frames.

In the case that the detection network is a non-cascaded detection network, because the key frame is the only input of the non-cascaded detection network, a too large number of delay frames arranged for the non-cascaded detection network may result in that a final acquired target detection result is too far from an actual position of a target in the key frame. Therefore, an accurate target detection result may be acquired by setting a smaller number of delay frames. For example, the number of delay frames is set as 4. Alternatively, the number of delay frames is set depending on actual needs. For example, more delay frames may be arranged in a case that the target is stable in the video stream (e.g. a live broadcast of an anchor usually includes only one target, that is the anchor, and the anchor is tracked), and fewer delay frames may be arranged in a case that the target is unstable (e.g. players in different video frames of a live broadcast of soccer game are different, and the players are tracked), which is not limited herein.

In S404, a total duration required for target detection on the key frame by the non-cascaded detection network is predicted.

In some optional embodiments of the present disclosure, the total duration required for the target detection on the key frame by the non-cascaded detection network is predetermined based on empirical values or the complexity of the key frame, or by inputting the key frame into a pre-trained duration estimation model. The way to predict the total duration required for the target detection on the key frame by the non-cascaded detection network is not limited herein.

In S405, an operation suspend time of each of computing nodes of the non-cascaded detection network is calculated based on the total duration and the specified number.

The operation suspend time of the computing node is the time at which the operation of the non-cascaded detection network is suspended during the operation of the non-cascaded detection network. That is, during the operation of the non-cascaded detection network, an operation start time of the non-cascaded detection network is used as a time starting point, in response to an operation duration reaching the operation suspend time of the computing node, the operation of the non-cascaded detection network is suspended and an intermediate operation result is saved, and in response to a resumption operation event, the operation of the non-cascaded detection network is resumed from the computing node. In the embodiment of the present disclosure, a sum of the numbers of delay frames and key frame are calculated, and a ratio of the total duration to the sum is the operation duration of each of the computing nodes. The operation suspend time of each of the computing nodes can be calculated by taking the time at which the key frame is input into the non-cascaded detection network as the time starting point and using the operation duration as a time step.

In an example of the present disclosure, the total duration of the non-cascaded detection network is evenly apportioned into a plurality of delay frames. Exemplarily, the number of delay frames is four, such that there are five video frames in total including the key frame. Assuming that the total duration for processing a key frame by the non-cascaded detection network is one second, a processing duration for each video frame is 200 milliseconds (1000/5), then each time the operation duration of the non-cascaded detection network reaches 200 milliseconds, one computing node occurs as an operation suspending point, or the operation suspend times of computing nodes are set respectively at 0.2 sec, 0.4 sec, 0.6 sec, and 0.8 sec from the time at which the key frame is input into the non-cascaded detection network. The above values are only examples, in practice, the number of delay frames may be set depending on actual needs to ensure that the operation duration for each key frame by the non-cascaded detection network is less than or equal to a time interval between two adjacent key frames.

In S406, upon the key frame being input into the non-cascaded detection network, an operation duration of the non-cascaded detection network is calculated.

Exemplarily, a timer is provided. Upon the key frame being input into the non-cascaded detection network, the timer starts timing, and a value of the timer is recorded as the operation duration of the non-cascaded detection network.

In S407, in response to the operation duration reaching the operation suspend time of the computing node, the operation of the non-cascaded detection network is suspended.

In response to the value of the timer reaching the operation suspend time of the computing node, the non-cascaded detection network saves a detection result of that moment and suspends the operation, wherein the detection result is a feature map extracted by the non-cascaded detection network from the key frame at the operation suspend time of the computing node. In practice, a program script may be used to control the non-cascaded detection network to suspend its operation. The way to control the non-cascaded detection network to suspend its operation is not limited herein.

In the embodiment of the present disclosure, in response to the value of the timer reaching the operation suspend time of the computing node, the timing of the timer is suspended.

In S408, each time one of the delay frames is received, the operation of the non-cascaded detection network is resumed from the suspended computing node.

Upon the operation of the non-cascaded detection network being suspended, each time one of the delay frames is received, the saved detection result is read and the operation of the non-cascaded detection network is resumed from the previously suspended computing node to continue to extract features of the key frame, and at the same time, the timing of the timer is resumed, such that the operation duration of the non-cascaded detection network is accumulated, and the like. Until the last delay frame is received, the timing of the timer is ended.

In S409, in response to receiving the last delay frame, a detection result output, upon resumption of the operation of the non-cascaded detection network, by the non-cascaded detection network is determined as the target detection result of the non-cascaded detection network.

Upon receiving the last delay frame from the video stream, a last portion operation of the non-cascaded detection network is resumed and a final target detection result is output.

In S410, a final target tracking result is generated based on the target detection result and a target tracking result of the last delay frame.

In S411, a target tracking result of the video frame is output.

Figure 4B:
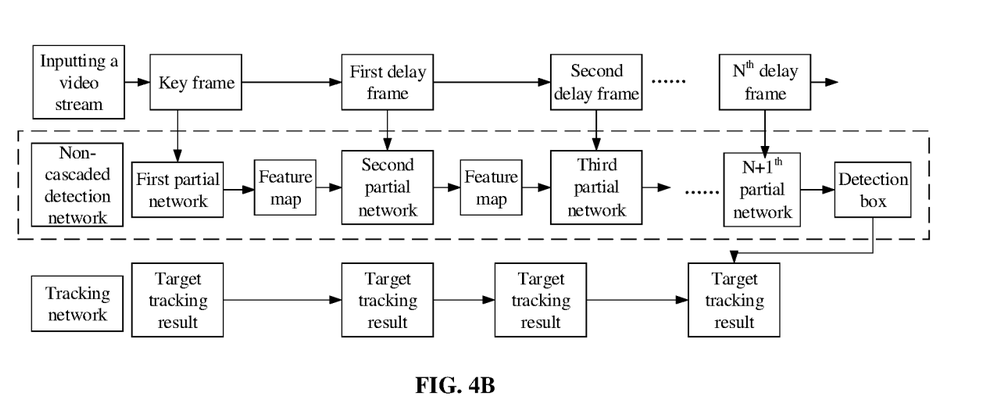
FIG. 4B is a schematic diagram of target detection based on a non-cascaded detection network according to Embodiment 4 of the present disclosure.

A process of the operation of the non-cascaded detection network during the period of receiving the delay frames is illustrated hereinafter in conjunction with FIG. 4B. As shown in FIG. 4B, the operation process of the non-cascaded detection network is as follows.

Upon the video stream being input, each video frame of the plurality of video frames is input into the tracking network, and the tracking network outputs the target tracking result of the each video frame. In the case that the video frame is the non-key frame, the target tracking result of the video frame is used as the final target tracking result.

In the case that the video frame is the key frame, N delay frames are determined, and the total duration required for the target detection on the key frame by the non-cascaded detection network is predicted. The operation suspend time of each of the computing nodes is determined based on the total duration and N, and the non-cascaded detection network is divided into a plurality of partial networks based on the operation suspend time. The operation duration of the non-cascaded detection network is calculated upon the key frame being input into a first partial network of the non-cascaded detection network. In response to the operation duration reaching the operation suspend time of the first partial network, the operation of the non-cascaded detection network is suspended and the feature map of the key frame is output. In response to receiving a first delay frame, the operation of the non-cascaded detection network is resumed on the basis of the feature map output at the previous suspension of operation, that is, the operation of a second partial network is started. In response to the operation duration reaching the operation suspend time of the second partial network, the operation of the non-cascaded detection network is suspended and the feature map of the key frame is output, and the like. In response to receiving an $N^{th}$ delay frame, an operation of an $(N+1)^{th}$ partial network is resumed and a detection box is output as the target detection result.

Then, the final target tracking result is generated by correlating the target detection result with a target tracking result of the $N^{th}$ delay frame.

According to the embodiment of the present disclosure, the operation suspend time of each of the computing nodes is calculated based on the estimated total duration required for the target detection on the key frame by the non-cascaded detection network and the number of delay frames, the operation of the non-cascaded detection network is suspended in response to the operation duration of the non-cascaded detection network reaching the operation suspend time, and the operation of the plurality of computing nodes are controlled to be resumed sequentially in response to sequentially receiving the specified number of delay frames. In this way, the time consumption of the target detection is apportioned into the period of receiving the plurality of delay frames, such that a time-consuming peak value of the target detection on the key frame is significantly reduced, a next video frame is capable of being played in time upon playing the key frame, and the video is capable of being played at a preset frame rate, ensuring that the video can be played smoothly.

Embodiment 5

Figure 5:
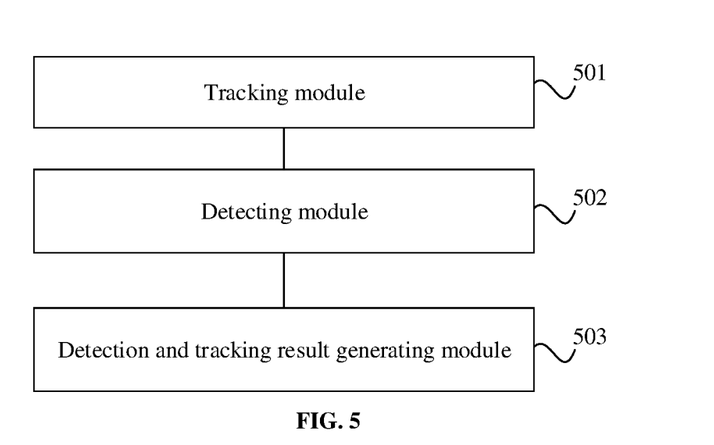
FIG. 5 is a structural diagram of an apparatus for detecting and tracking a target according to Embodiment 5 of the present disclosure.

FIG. 5 is a structural diagram of an apparatus for detecting and tracking a target according to Embodiment 5 of the present disclosure. As shown in FIG. 5, the apparatus for detecting and tracking the target according to the embodiment of the present disclosure includes:
a tracking module 501, configured to acquire a target tracking result of each video frame of a plurality of video frames received from a video stream by inputting the each video frame of the plurality of video frames into a tracking network; a detecting module 502, configured to in response to a video frame of the plurality of video frames being a key frame, acquire a target detection result output by a detection network upon receiving a last delay frame in a specified number of delay frames by inputting the key frame into the detection network and controlling the detection network to operate during a period of receiving the specified number of delay frames, wherein the key frame is a video frame for target detection in the video stream, and the specified number of delay frames are successive video frames following the key frame; and a detection and tracking result generating module 503, configured to generate a final target tracking result based on the target detection result and a target tracking result of the last delay frame.

The apparatus for detecting and tracking the target according to the embodiment of the present disclosure is capable of performing the method for detecting and tracking the target provided by any of Embodiment 1 to Embodiment 4 of the present disclosure, has corresponding functional modules to perform the method, and achieves similar effects.

Embodiment 6

Figure 6:
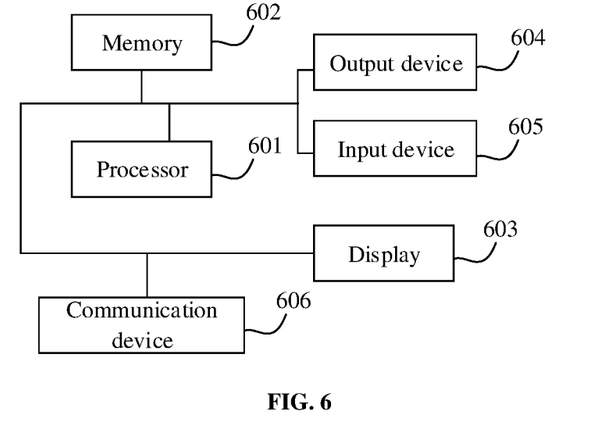
FIG. 6 is a structural schematic diagram of an electronic device according to Embodiment 6 of the present disclosure.

FIG. 6 is a structural schematic diagram of an electronic device according to Embodiment 6 of the present disclosure. As shown in FIG. 6, the electronic device includes: a processor 601, a memory 602, a display 603 with a touch function, an input device 604, an output device 605, and a communication device 606. The number of processors 601 in the device may be one or more, and one processor 601 is taken as an example in FIG. 6. The processor 601, the memory 602, the display 603, the input device 604, the output device 605, and the communication device 606 of the device are connected via a bus or other ways, and the connection via the bus is taken as an example in FIG. 6. The electronic device is configured to perform the method for detecting and tracking the target provided by any of the embodiments of the present disclosure.

Some embodiments of the present disclosure further provide a non-transitory computer-readable storage medium storing one or more computer programs therein, wherein the one or more computer programs, when loaded and run by a processor of a device, cause the device to perform the method for detecting and tracking the target as described in the above method embodiments.

The descriptions of the apparatus, electronic device, and storage medium embodiments are relatively simple because they are substantially similar to the method embodiments. For the relevant portions, reference may be made to descriptions of the method embodiments.

In the description herein, the terms "an embodiment," "some embodiments," "example," or "some examples," and the like indicate that the features, structures, materials, or characteristics described in the embodiment or example are included in at least one embodiment or example of the present disclosure. In this disclosure, the schematic descriptions of the above terms don't necessarily refer to the same embodiment or example. Furthermore, the features, structures, materials, or characteristics described may be combined in any one or more embodiments or examples in a suitable manner.

What is claimed is:

1. A method for detecting and tracking a target, comprising:
    acquiring a target tracking result of each video frame of a plurality of video frames received from a video stream by inputting the each video frame of the plurality of video frames into a tracking network, wherein the tracking network is configured to track a detected target in a video frame; wherein
        in response to a video frame of the plurality of video frames being a key frame, acquiring a target detection result output by a detection network upon receiving a last delay frame in a specified number of delay frames by simultaneously inputting the key frame into the detection network and controlling the detection network to operate during a period of receiving the specified number of delay frames, wherein the key frame is a video frame for target detection in the video stream, and the specified number of delay frames are successive video frames following the key frame, wherein
            the detection network comprises a plurality of computing nodes, the plurality of computing nodes being configured to control suspension or resumption of an operation of the detection network during the operation of the detection network; wherein
                the detection network is a cascaded detection network, and the target detection result is acquired by: upon inputting the key frame into the detection network, inputting a received delay frame into the detection network and controlling the plurality of computing nodes of the detection network to operate sequentially in response to sequentially receiving the specified number of delay frames, and acquiring the target detection result output by the detection network upon receiving the last delay frame; or
                the detection network is a non-cascaded detection network, and the target detection result is acquired by: upon inputting the key frame into the detection network, controlling the plurality of computing nodes of the detection network to operate sequentially in response to sequentially receiving the specified number of delay frames, and acquiring the target detection result output by the detection network upon receiving the last delay frame; and
        generating a final target tracking result of the last delay frame based on the target detection result and a target tracking result of the last delay frame, wherein a tracked target list in the final target tracking result of the last delay frame is updated based on a detected target list in the target detection result, and target tracking for subsequent frames is performed based on the updated tracked target list.

2. The method according to claim 1, wherein acquiring the target detection result output by the detection network upon receiving the last delay frame in the specified number of delay frames by inputting the key frame into the detection network and controlling the detection network to operate during the period of receiving the specified number of delay frames comprises:
    in the case that the detection network is the non-cascaded detection network, determining the specified number of delay frames and determining the plurality of computing nodes of the detection network based on the specified number; or,
    in the case that the detection network is the cascaded detection network, determining the plurality of computing nodes of the detection network and determining the specified number of delay frames based on the plurality of computing nodes of the detection network.

3. The method according to claim 2, wherein
    the detection network is the cascaded detection network comprising multiple levels of sub-networks; and
    determining the plurality of computing nodes of the detection network comprises:
        acquiring a first number of the sub-networks of the cascaded detection network; and
        setting an input node of each of the sub-networks in the first number of the sub-networks as the computing node.

4. The method according to claim 3, wherein determining the specified number of delay frames based on the plurality of computing nodes of the detection network comprises:
    determining, based on the first number, a plurality of successive video frames following the key frame as the specified number of delay frames.

5. The method according to claim 4, wherein controlling the plurality computing nodes of the detection network to operate sequentially in response to sequentially receiving the specified number of delay frames, and acquiring the target detection result output by the detection network upon receiving the last delay frame comprises:
    upon inputting the key frame into a first-level sub-network of the cascaded detection network, each time one of the delay frames is received, inputting a previous detection result output by a previous-level sub-network and the one of the delay frames into a current-level sub-network; and upon receiving the last delay frame, determining a current detection result output by the current-level sub-network as the target detection result of the cascaded detection network.

6. The method according to claim 2, wherein
the detection network is a non-cascaded detection network; and
determining the specified number of delay frames comprises:
  determining a specified number of successive video frames following the key frame as the specified number of delay frames.

7. The method according to claim 6, wherein determining the plurality of computing nodes of the detection network based on the specified number comprises:
  predicting a total duration required for the target detection on the key frame by the non-cascaded detection network; and
  calculating an operation suspend time of each of the computing nodes of the non-cascaded detection network based on the total duration and the specified number.

8. The method according to claim 7, wherein upon inputting the key frame into the detection network, controlling the plurality computing nodes of the detection network to operate sequentially in response to sequentially receiving the specified number of delay frames, and acquiring the target detection result output by the detection network upon receiving the last delay frame comprises:
  timing an operation duration of the non-cascaded detection network upon inputting the key frame into the non-cascaded detection network;
  in response to the operation duration reaching the operation suspend time of the computing node, suspending an operation of the non-cascaded detection network;
  resuming the operation of the non-cascaded detection network from a suspended computing node each time one of the delay frames is received; and
  in response to the last delay frame being received, determining a detection result output, upon resumption of the operation of the non-cascaded detection network, by the non-cascaded detection network as the target detection result of the non-cascaded detection network.

9. The method according to claim 1, wherein upon acquiring the target detection result output by the detection network upon receiving the last delay frame in the specified number of delay frames by inputting the key frame into the detection network and controlling the detection network to operate during the period of receiving the specified number of delay frames, the method further comprises:
  determining whether the video frame is the key frame; and
  in response to the video frame being the key frame, performing the process of acquiring the target detection result output by the detection network upon receiving the last delay frame in the specified number of delay frames by inputting the key frame into the detection network and controlling the detection network to operate during the period of receiving the specified number of delay frames; and
the method further comprises:
  in response to the video frame being not the key frame, outputting the target tracking result of the video frame.

10. The method according to claim 1, wherein generating the final target tracking result of the last delay frame based on the target detection result and the target tracking result of the last delay frame comprises:
  updating a tracked target list in the target tracking result based on a detected target list in the target detection result; and
  updating a state of a target in the tracked target list.

11. The method according to claim 10, further comprising:
  determining a key frame in response to a target state of a target in the tracked target list being indicated as lost; and
  acquiring a target detection result by inputting the determined key frame into the detection network.

12. The method according to claim 11, wherein determining the key frame in response to the target state of the target in the tracked target list being indicated as lost comprises:
  in response to the target state of the target in the tracked target list being indicated as lost, determining an Nth video frame received following the last delay frame as the key frame, wherein N is a natural number.

13. An electronic device for detecting and tracking a target, comprising:
  at least one processor; and
  a memory configured to store at least one program;
  wherein the at least one processor, when loading and running the at least one program, is caused to perform:
    acquiring a target tracking result of each video frame of a plurality of video frames received from a video stream by inputting the each video frame of the plurality of video frames into a tracking network, wherein the tracking network is configured to track a detected target in a video frame; wherein
    in response to a video frame of the plurality of video frames being a key frame, acquiring a target detection result output by a detection network upon receiving a last delay frame in a specified number of delay frames by simultaneously inputting the key frame into the detection network and controlling the detection network to operate during a period of receiving the specified number of delay frames, wherein the key frame is a video frame for target detection in the video stream, and the specified number of delay frames are successive video frames following the key frame, wherein
    the detection network comprises a plurality of computing nodes, the plurality of computing nodes being configured to control suspension or resumption of an operation of the detection network during the operation of the detection network; wherein
    the detection network is a cascaded detection network, and the target detection result is acquired by: upon inputting the key frame into the detection network, inputting a received delay frame into the detection network and controlling the plurality of computing nodes of the detection network to operate sequentially in response to sequentially receiving the specified number of delay frames, and acquiring the target detection result output by
    the detection network upon receiving the last delay frame; or the detection network is a non-cascaded detection network, and the target detection result is acquired by: upon inputting the key frame into the detection network, controlling the plurality of computing nodes of the detection network to operate sequentially in response to sequentially receiving the specified number of delay frames, and acquiring the target detection result output by the detection network upon receiving the last delay frame; and generating a final target tracking result of the last delay frame based on the target detection result and a target tracking result of the last delay frame, wherein a tracked target list in the final target tracking result of the last delay frame is updated based on a detected target list in the target detection result, and target tracking for subsequent frames is performed based on the updated tracked target list.

14. A non-transitory computer-readable storage medium storing one or more computer programs therein, wherein the one or more computer programs, when loaded and run by a processor, cause the processor to perform:

acquiring a target tracking result of each video frame of a plurality of video frames received from a video stream by inputting the each video frame of the plurality of video frames into a tracking network, wherein the tracking network is configured to track a detected target in a video frame; wherein in response to a video frame of the plurality of video frames being a key frame, acquiring a target detection result output by a detection network upon receiving a last delay frame in a specified number of delay frames by simultaneously inputting the key frame into the detection network and controlling the detection network to operate during a period of receiving the specified number of delay frames, wherein the key frame is a video frame for target detection in the video stream, and the specified number of delay frames are successive video frames following the key frame, wherein the detection network comprises a plurality of computing nodes, the plurality of computing nodes being configured to control suspension or resumption of the operation of the detection network during the operation of the detection network; wherein the detection network is a cascaded detection network, and the target detection result is acquired by: upon inputting the key frame into the detection network, inputting a received delay frame into the detection network and controlling the plurality of computing nodes of the detection network to operate sequentially in response to sequentially receiving the specified number of delay frames, and acquiring the target detection result output by the detection network upon receiving the last delay frame; or the detection network is a non-cascaded detection network, and the target detection result is acquired by: upon inputting the key frame into the detection network, controlling the plurality of computing nodes of the detection network to operate sequentially in response to sequentially receiving the specified number of delay frames, and acquiring the target detection result output by the detection network upon receiving the last delay frame; and generating a final target tracking result of the last delay frame based on the target detection result and a target tracking result of the last delay frame, wherein a tracked target list in the final target tracking result of the last delay frame is updated based on a detected target list in the target detection result, and target tracking for subsequent frames is performed based on the updated tracked target list.

15. The electronic device according to claim 13, wherein the at least one processor, when loading and running the at least one program, is caused to perform:

in the case that the detection network is the non-cascaded detection network, determining the specified number of delay frames and determining the plurality of computing nodes of the detection network based on the specified number; or, in the case that the detection network is the cascaded detection network, determining the plurality of computing nodes of the detection network and determining the specified number of delay frames based on the plurality of computing nodes of the detection network.

16. The electronic device according to claim 15, wherein the detection network is a cascaded detection network comprising multiple levels of sub-networks; and the at least one processor, when loading and running the at least one program, is caused to perform:

acquiring a first number of the sub-networks of the cascaded detection network; and setting an input node of each of the sub-networks in the first number of the sub- networks as the computing node.

17. The electronic device according to claim 16, wherein the at least one processor, when loading and running the at least one program, is caused to perform:

determining, based on the first number, a plurality of successive video frames following the key frame as the specified number of delay frames.

18. The electronic device according to claim 17, wherein the at least one processor, when loading and running the at least one program, is caused to perform:

upon inputting the key frame into a first-level sub-network of the cascaded detection network, each time one of the delay frames is received, inputting a detection result output by a previous-level sub-network and the one of the delay frames into a current-level sub-network; and upon receiving the last delay frame, determining a detection result output by the current-level sub-network as the target detection result of the cascaded detection network.

19. The electronic device according to claim 15, wherein the detection network is a non-cascaded detection network; and the at least one processor, when loading and running the at least one program, is caused to perform:

determining a specified number of successive video frames following the key frame as the specified number of delay frames.

20. The electronic device according to claim 19, wherein the at least one processor, when loading and running the at least one program, is caused to perform:

predicting a total duration required for the target detection on the key frame by the non-cascaded detection network; and calculating an operation suspend time of each of the computing nodes of the non- cascaded detection network based on the total duration and the specified number.

* * * * *